United States Patent [19]

Lupoli et al.

[11] Patent Number: 4,565,991

[45] Date of Patent: Jan. 21, 1986

[54] CHIME GENERATOR CIRCUIT FOR CONNECTION WITH EXISTING AUTOMOBILE RADIO SPEAKER

[75] Inventors: Peter J. Lupoli, Hamden; Brooke N. Westover, Stratford, both of Conn.

[73] Assignee: Casco Products Corporation, Bridgeport, Conn.

[21] Appl. No.: 509,246

[22] Filed: Jun. 30, 1983

[51] Int. Cl.$^4$ .................................................. B60Q 1/00
[52] U.S. Cl. ................................ 340/52 R; 340/52 F; 340/384 E
[58] Field of Search ................ 340/52 R, 52 D, 52 E, 340/52 F, 384 E, 692; 381/86, 110; 180/271, 272, 273, 286

[56] References Cited

U.S. PATENT DOCUMENTS

| | | | |
|---|---|---|---|
| 3,518,375 | 6/1970 | Hawkins | 381/110 X |
| 4,193,060 | 3/1980 | Slavin et al. | 340/52 D |
| 4,389,639 | 6/1983 | Torii et al. | 340/52 F X |

Primary Examiner—James L. Rowland
Assistant Examiner—Chi K. Lau
Attorney, Agent, or Firm—Mitchell D. Bittman

[57] ABSTRACT

A chime generator circuit of the type employed to monitor the condition of parameters associated with an automobile, such as warning functions involving headlight operation, fastening of a seat belt, or indications of the ignition key having been inadvertently left in place as the driver is leaving the vehicle, etc. The circuit employs an oscillator which is modulated at a relatively low frequency, on the order of one or two cycles per second, and a unique coupling arrangement for exciting one of the existing speakers of the automobile radio to provide the necessary audible sound. In the disclosed device, the output of a signal generator is fed directly to one speaker, and a switch is interposed in the line extending between the radio output and the speaker. When the switch is open, the radio and speaker are isolated from one another and the generator feeds the speaker directly, producing the desired sound and warning the driver that a certain condition exists. A sensor and driver circuit receives a signal from the generator when the latter is operating, and controls the switch. The generator is enabled or disabled by one or more monitor switches that are disposed at various locations about the vehicle, and which open or close depending on the conditions being monitored. By the above arrangement, there is possible a significant cost reduction by elimination of the relatively expensive transducer heretofore associated with chime generators, since the present generator employs one of the existing speakers associated with the vehicle's radio.

18 Claims, 3 Drawing Figures

CHIME GENERATOR CIRCUIT FOR CONNECTION WITH EXISTING AUTOMOBILE RADIO SPEAKER

BACKGROUND

This invention relates generally to monitoring systems for automobiles and other vehicles, and more particularly to signal generators of the type which incorporate sound transducers to produce audible chime-type sounds that indicate to the driver that a particular condition being monitored is in a certain mode or state.

In the past numerous chime generator circuits have been proposed and produced. Older model automobiles employed various types of buzzers or mechanical vibrators which are linked to switches disposed in various locations about the vehicle for reminding the driver that either the seat belts were not fastened, or that the headlights were inadvertently left on, etc. With the advent of the newer model cars, such mechanical type sound transducers have been replaced by electronic chime generator circuits which result in a significantly more pleasing sound than that produced by the older buzzer or vibrator types. The chime generators generally consist of an oscillator operating between 700 and 800 Hz which is modulated by a pulse having a relatively long rise and fall time, the pulse repetition frequency being on the order of the one cycle per second or so. The long rise and fall time produces the characteristic soft, ringing sound of a chime.

Conversion to the use of chime generators has not been without considerable sacrifice in complexity or cost, as compared to the prior warning systems that have been employed. In many installations, the chime generator was constructed as a plug-in module, and the electrical output of the generator was applied to a miniature electromagnetic speaker that was disposed within the module and constituted an integral part thereof. Needless to say, the cost of the miniature speaker was considerable; furthermore the sound produced by the chime generator lacked good quality and also emanated from the particular location of the module, which muffled the sound and sometimes resulted in poor audibility.

A number of other arrangements have been proposed and produced, as evidenced by the devices illustrated in U.S. Pat. Nos. 4,284,857; 4,232,287 and 4,160,132. In these patented arrangements, the transducer took the form of a flexible diaphragm of disk-like configuration, which was secured at its periphery, with an electromagnetic pole piece mounted beneath the diaphragm and disposed adjacent its center. A signal generator applied power to the coil surrounding the pole piece, causing the diaphragm to vibrate at an audio frequency, thus producing the desired sound. While such devices could be made to operate satisfactorily, they were relatively expensive to manufacture and mass produce, and brought about a number of their own problems which are peculiar to such devices. In this connection, reference is made to column 2 of Patent No. '132, line 42, where there is given an indication that the tolerances of certain gap dimensions associated with such devices must be kept within certain limits, falling which the quality of the sound produced suffered. See also column 4 of Patent No. '857, line 44 on; and column 2 of the same reference, the last few lines to the beginning of column 3.

SUMMARY

The above disadvantages and drawbacks of prior chime generator systems are largely obviated by the present invention, which has for one object the provision of a novel and improved monitoring system which is extremely simple in construction, while at the same time providing a better tone quality and a reliable and foolproof indication to the operator or driver of the vehicle as to the state of a particular condition being monitored.

A related object of the invention is to provide an improved monitoring system as above set forth, which is economical to manufacture and which lends itself to mass production techniques, without expensive or time consuming adjustments being required.

Still another object of the invention is to provide an improved monitoring system as above characterized, by which there is completely eliminated the need for a separate transducer, thus reducing the overall cost of the system.

Yet another object of the invention is to provide an improved monitoring system of the kind indicated, which is readily adaptable to existing automobile installations, with little or no modification to existing equipment being required, and wherein the device can be readily installed in module form and easily wired into the vehicle's electrical system.

A still further object of the invention is to provide an improved monitoring system as outlined above, wherein an existing transducer, namely a speaker employed with the vehicle's radio, is utilized to provide the required audible sound from the monitoring system, all without any modification of the radio being required, or without modifications to the transducer or speaker being necessitated.

A still further object of the invention is to provide an improved monitoring system as above indicated, wherein if the need arises, pre-testing can be readily accomplished in a laboratory test fixture, without the need for complex wiring arrangements or on-site test procedures.

Still another object of the invention is to provide an improved monitoring system as above described, wherein no critical adjustments of any kind are required following assembly, and wherein little or no reliance on critical tolerances is required.

The above objects are accomplished by the provision of a novel monitoring system for an automobile or other vehicle, comprising an automobile radio having an on-off switch enabling it to be energized from the vehicle electrical supply, and having at least two audio output lines and a pair of speakers, one of which is connected with one of said audio output lines, an audio signal generator electrically connected to and powered by the electrical system of the vehicle, and having an output lead adapted to drive a speaker, and means electrically connected with the audio signal generator and responsive to changes in a condition in the automobile, or vehicle that is being monitored, for selectively coupling at least a portion of the audio signal from the signal generator to at least one of the speakers so as to produce a warning sound that will indicate to the driver the state of the condition being monitored. The amplitude of the coupled signal, when applied to the speaker, is adequate to enable it to be readily heard regardless of whether the radio is energized or not. By the above arrangement, there is eliminated the need for a separate transducer for the signal generator, since one of the existing speakers associated with the automobile's radio is utilized. In addition, no modification to the internal circuitry of the radio is required; nor is any modification to the speaker involved. The unit can be mass produced as a plug-in type module, and the wiring from the socket that mates with the plug modified slightly, as by breaking into the lead extending between the one speaker being used and the output of the radio.

Also, the device does not require any adjustments of any kind. Accordingly there is realized a substantial saving in manufacturing time, especially where it is desired to mass produce such items. Overall cost saving is thus realizeable, both from reduced manufacturing and installation time, and through the elimination of the relatively expensive transducer for the signal generator that was heretofore required.

Other features and advantages will hereinafter appear.

In the drawings, illustrating a preferred embodiment of the invention:

Figure 1:
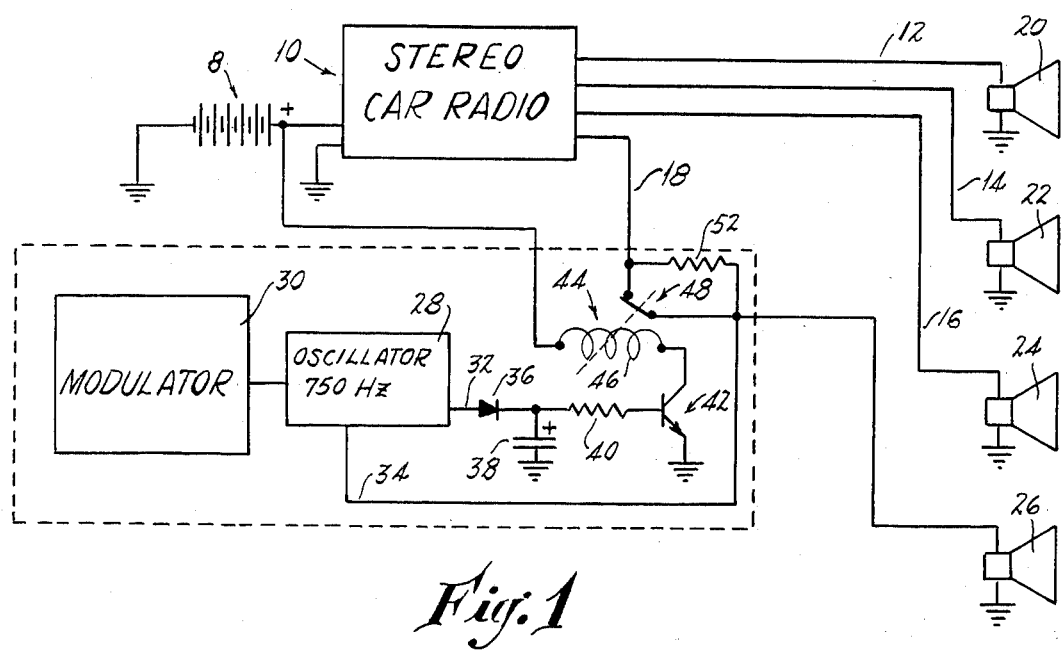
FIG. 1 is a simplified block diagram of the improved monitoring system of the present invention.

Referring first to FIG. 1, there is illustrated, in block diagram form, a portion of the electrical system of a vehicle, comprising an automobile battery 8 having one terminal connected to vehicle ground, and being adapted to power the various parts of the system; also illustrated is a radio 10 energizeable from the vehicle supply in the conventional manner, having multiple audio output lines 12, 14, 16 and 18 which are intended to be electrically connected to corresponding speakers 20, 22, 24 and 26, respectively. The illustrated arrangement involves four speakers, but two could be employed as well.

In accordance with the present invention there is provided a novel and improved monitoring system for the automobile, for signalling the existence of certain conditions which occur periodically during the operation of the vehicle, such as indicating the presence or absence of the ignition key in the ignition switch, the energization of the vehicle's headlights, and the condition of the seat belts of the vehicle, that is, whether or not they are properly fastened. The monitoring system comprises an audio signal generator which in the present instance includes an oscillator 28 operating preferably in the neighborhood of 750 Hz, and a modulator 30 which modulates the oscillator at a rate on the order of one Hz or so. The modulator is arranged to impart a relatively slow rise and fall time to the modulated envelope, shown in FIG. 3, so that a soft, ringing sound which simulates a chime is generated, as opposed to a "beep" which would be characteristic of a modulated tone where the rise and fall time of the modulating signal is relatively fast.

Figure 3:
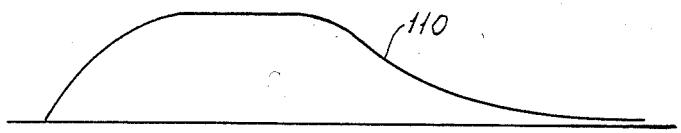
FIG. 3 is a graph of one of the waveforms generated by the signal generator.

By the present invention, two separate output lines are provided from the signal generator, one being designated 32 and adapted to carry solely the 750 Hz oscillator signal, and other being indicated 34 and carrying the modulated signal of FIG. 3. Energization of the signal generator 28, 30 is controlled by closures of a series of switches located at various locations about the vehicle, as will be more fully explained below in connection with the discussion of the detailed diagram set forth in FIG. 2.

The signal generator 28, 30 is arranged to have at least a portion of its modulated output on line 34 electrically coupled to at least one of the automobile speakers that are associated with the vehicle's radio, such that when the generator is in operation, there will be produced in the one speaker a chime that will indicate the existence of one or several conditions within the vehicle. During the operation of the signal generator 28, 30 the one designated speaker is at least partially electrically isolated from the output circuit (not shown) of the radio 10, namely that circuit which is connected with and supplies energy to the audio output line 18 in FIG. 1. Such an arrangement insures that the radio's output circuit does not load the output of the signal generator (line 34), which might otherwise tend to interfere with proper operation thereof, or to impair the quality of the chime signal.

In accomplishing the simultaneous coupling of the modulated signal on line 34 to the speaker 26, and the isolation of the speaker 26 from the output line 18 of the radio, there is provided a sensing and switching circuit which is rendered operable when the oscillator 28 is functioning. The sensing and switching circuit comprises a rectifier 36, a filter capacitor 38, resistor 40, transistor switch 42, and a relay 44 having a coil 46 and contactor terminals or contacts 48. Connected across the contacts 48 in an impedance, which can take the form of a resistor 52, whose function is to insure that the output line 18 of the radio has connected to it at all times at least a nominal load, so as to prevent the possibility of damage occurring to its output transistors. Such damage could otherwise result if the lead 18 were left without a load, even for a short time interval.

Figure 2:
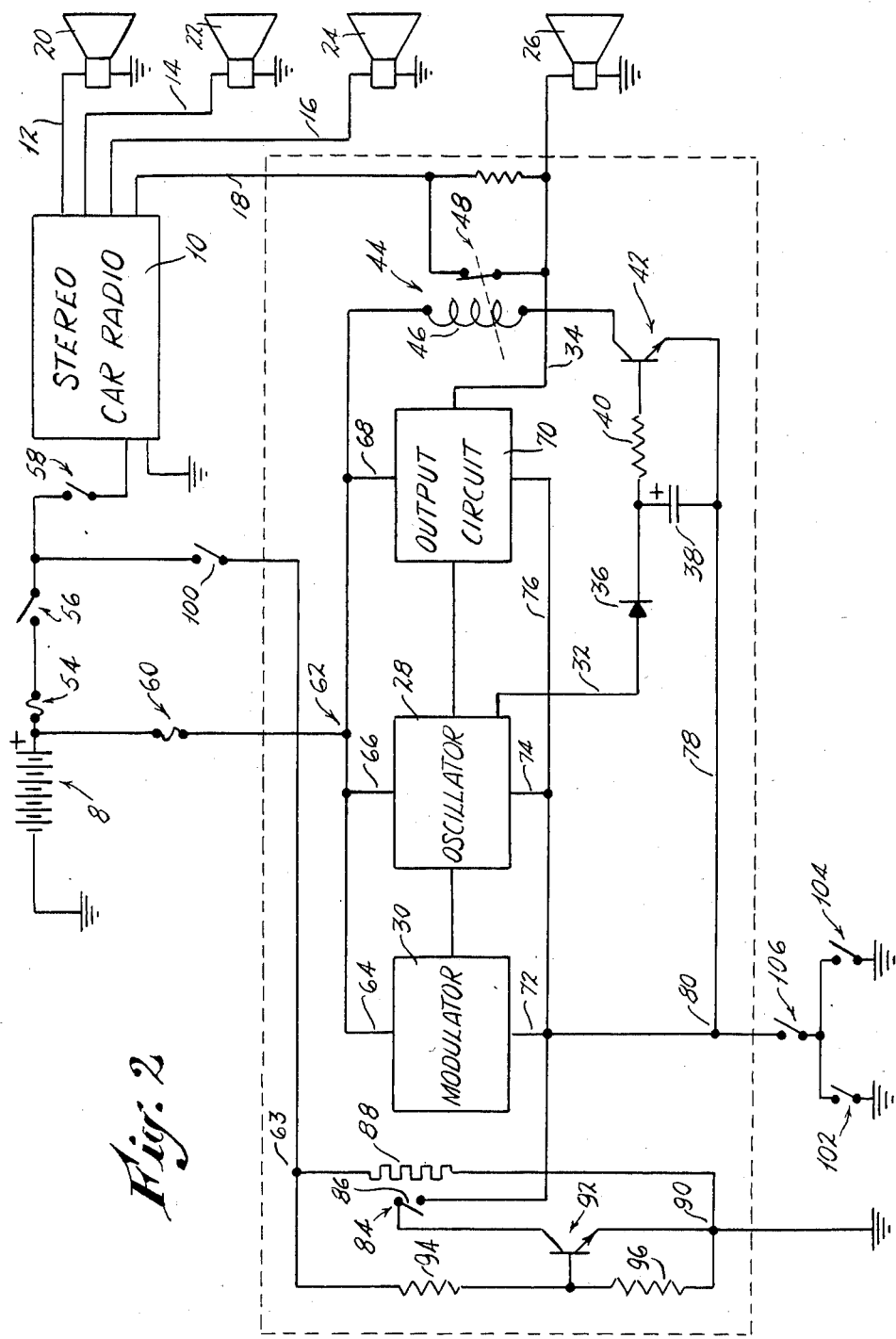
FIG. 2 is a detailed block diagram of the monitoring system, showing external connections of monitor switches that are located at various desired locations in the vehicle.

A more detailed block diagram of the monitoring arrangement of FIG. 1 is illustrated in FIG. 2, which includes the various switches that are located about the vehicle, and which interact with the monitoring system to produce the desired warning indications. Like reference numerals have been assigned to the similar parts in FIGS. 1 and 2.

The positive supply lead of the vehicle battery 8 extends through suitable fusing 54 to the ignition switch 56, and from there to one terminal of the radio on-off switch 58. The other terminal of the switch 58 is connected to the radio 10, all in the usual manner. The positive supply lead of the battery is also connected to another fuse 60, which extends to the positive supply terminal 62 of the monitoring system module, shown in dotted outline. As illustrated, this lead 62 is connected to the positive terminals 64, 66 and 68 of the modulator 30, and oscillator 28 with its output circuit 70 that may optionally be interposed between the output line of the early stages of the oscillator 28 and the lead which extends to the relay contacts 48. The output circuit may take the form of an additional power amplifier stage constituted as a single transistor having relatively low gain, or as a buffer or emitter follower, or other arrangement, as necessitated in order to provide the required power to the speaker being driven. The output portion of the stage 70 is preferably capacitively coupled to the line 34. Stage 70 can be omitted if the stage 28 has sufficient output to adequately drive the speaker directly. The negative supply terminals 72, 74, 76 and 78 of the modulator 30, oscillator 28 and its output circuit 70, and network comprising capacitor 38 and transistor 42 are all connected together as illustrated, and extend to a common negative supply terminal 80 of the module.

As illustrated in FIG. 2, there is provided a timer switch 84, having a bimetal contact 86 and including a heater element 88, one end of which is connected to a terminal 90, which extends to vehicle ground at all times, and the other end of which extends to a terminal 63 on the module. One of the contacts of the switch 84 is electrically connected to the terminals 72, 74, 76 and 78, as shown.

The other contact 86 is connected to the collector of a transistor 92 whose emitter extends to terminal 90. Biasing resistors 94 and 96 control the switching action of this transistor, which is a function of the closure of a seat belt monitoring switch, as will be explained below.

Disposed at convenient locations about the vehicle are the switches with which the monitoring system is intended to function, these including a seat belt monitoring switch 100, an ignition key monitoring switch 102, a headlight monitoring switch 104, and a door jamb switch 106. As illustrated, the seat belt switch 100 is connected in series with the lead that supplies the timer switch 84; the door jamb switch 106 is in series with the parallel combination of the switches 102 and 104, both of which have one terminal connected to vehicle ground at all times.

In operation of the monitoring system of the present invention, a signal constituted as a series of chimes or tone bursts is applied to the speaker 26 when any of the following sequences occurs;

(1) The driver's door is opened with the ignition key left in the ignition; the tone bursts continue indefinitely until either the door is closed, or the key removed.

(2) The driver's door is opened with the headlights on; the tone bursts continue indefinitely until either the door is closed, or the headlights turned off.

(3) After a previously unattended vehicle is entered and after the ignition is turned on, the tone bursts commence until either a period of 10 seconds elapses, or until the driver's seat belt is fastened, whichever occurs first.

For the system set forth in FIG. 2, the various vehicle monitoring switches assume the following states, corresponding to monitored conditions, as set forth below:

The driver's seat belt switch 100, which is disposed adjacent to or inside the buckle mechanism, is closed when the seat belt is not fastened, and opens when the belt is fastened.

The switch 102 is closed when the ignition key is inserted in the ignition, and opens when the key is removed.

The switch 104 is closed when the headlights are energized, and opens when they are turned off.

The ignition switch 56 and radio on-off switch 58 are operated in the conventional manner.

The bimetal operated timer switch 84 is normally closed when the bimetal is cold, and opens when the element 88 heats, typically 10 seconds following its initial energization.

The contacts 48 of the relay 44 are normally closed when the signal generator comprising the oscillator 28, 70 and modulator 30 are not functioning.

The technical operation of the improved monitoring system of the present invention may now be readily understood by referring to FIG. 2. With the signal generator inactive, the radio 10 may be used in the normal manner, since the output lead 18 is connected directly through the relay contacts 48 to the speaker 26. Output from the remaining lines 12, 14 and 16 is similarly fed to the respective speakers, as in FIG. 1. It is noted that the output line 34 from the circuit 70 is always connected to the speaker 26, but in practice, no interference is encountered because the output impedance of the circuit 70 is higher than the driving impedance of the radio's output stage, line 18.

In the case where the ignition key has been inserted and the ignition turned on, the signal generator 28, 30, 70 is enabled as follows: Positive battery voltage is applied, through the closed seat belt switch 100, to the heater 88. Switch contacts 86 are closed prior to heating of the element 88, and the terminals 72, 74, 76 and 78 are brought to a point near ground potential by transistor 92 which has been rendered conducting through resistor 96. Accordingly, the signal generator commences operation immediately, and continues to operate until either the bimetal 88 heats sufficiently to open the switch contacts 86, or the driver fastens his seat belt, which opens switch 100, and renders the transistor 92 non-conducting thereby interrupting the ground connection to terminals 72, 74, 76 and 78.

During operation of the generator 28, 30, 70, two separate output signals are produced, one on line 32, and the other on line 34. The output on line 32 is a continuous, unmodulated carrier wave on the order of 750 Hz, which is fed directly to the sensing and switching circuit comprising rectifier 36, filter capacitor 38, limiter resistor 40, transistor switch 42, and relay 44. The rectifier converts the A.C. signal to a D.C. level which in turn switches on the transistor 42 and causes the relay 44 to operate, opening the normally closed contacts 48. This has the effect of introducing an isolating or attenuating impedance, namely resistor 52, in series with the lead 18 and speaker 26, while at the same time maintaining the continuous connection between the line 34 and the speaker 26.

The other output from the oscillator, line 34, carries the modulated waveform, which consists typically of bursts of 1 second or less, of 750 Hz signal, with the wave envelope having relatively slow rise and fall times as noted above. The time between adjacent bursts is generally one or two seconds. An outline 110 of the envelope of a typical single chime burst is illustrated in FIG. 3. The carrier signal (typically a 750 Hz sine wave) cannot be depicted in this figure, since the lines representing the carrier would be so close together as to overlap one another. This modulated signal is applied to the speaker 26 and produces the desired chime sound, with little distortion occurring due to loading from the output of the radio, by virtue of the introduction of the impedance 52 in series with the radio lead. It is noted that the speaker 26 can be driven by the output circuit 70 regardless of whether the radio is on or not. In the event that the radio is off, the speaker 26 responds solely to the chime. If the radio is on, and speaker 26 is being driven by the output stage thereof, line 18, the radio signal will be momentarily interrupted (i.e. greatly attenuated), and the chime signal substituted therefor. The degree of attenuation is sufficient so that for all practical purposes, the radio signal is completely masked by the chime. In addition, the chime signal (on line 34) from the output circuit 70 is of sufficient intensity to enable it to be heard regardless of whether the radio is energized or not. As soon as either the time interval determined by the element 88 elapses, or the driver fastens his seat belt, the signal generator is disabled, closing the relay contacts 48, and re-connecting the speaker 26 to the line 18.

The present monitoring system is also arranged to indicate a condition wherein, as the driver is leaving the vehicle, he has inadvertently either left the key in the ignition or left the headlights on. In accomplishing this there is provided a switch 106 located in the door jamb of the driver's side, the switch being open when the door is closed and vice-versa. The switch 102 mentioned above is disposed in the steering column, and is open with the ignition key removed and closed with the key inserted. Switch 104 is open with the headlights off, and closes when the headlights are turned on. When the driver opens his door, switch 106 will close and if either the key has been left in the ignition or the headlights left on, one of the switches 102 or 104 will be closed, thus completing the circuit from terminal 80 to ground and activating the signal generator. The generator will remain active until either the door is closed, or the key removed or headlights turned off, as required to interrupt this connection to ground.

It is noted that with the present invention, virtually all of the circuitry involved with the signal generator can be incorporated in a single module, namely that part of FIG. 2 which is indicated in dotted outline. The arrangement also has the advantage that only minor modification is required to the wiring of the vehicle. It is not necessary to modify, in any way, the vehicle radio. The only wiring alterations involve breaking the hot lead of one speaker (speaker 26), and making the necessary connections to the switches of the vehicle, as indicated in this Figure. The unique arrangement wherein the impedance 52 remains connected to the output line 18 at all times, provides a high degree of protection by eliminating the possibility of damage occurring to the radio's output transistors as a result of loss of load. This impedance can be on the order of 50 ohms, resistive, which substantially exceeds the speaker impedance, typically a few ohms.

Since there has been eliminated the need for a separate inferior quality transducer of some type for the generation of the chimes, a substantial cost saving is realizeable while improved tone is had. This is considered to be of great significance in the automobile industry, especially where reductions in cost of even a few cents are deemed to be of importance.

Use of the monitoring system of the present invention does not adversely affect radio operation. With the radio on, when the one speaker is being driven by the signal generator, the radio signal which was being heard through that speaker will be interrupted momentarily, and will resume when the generator ceases operation. The specific arrangement disclosed has been found to provide both excellent tone or chime quality, while not causing any noticeable distortion in the quality of the sound produced during conventional operation of the radio.

Accordingly, the present construction is seen to represent a distinct advance and improvement in the technology of automobile monitoring systems.

Each and every one of the appended claims defines an aspect of the invention that is distinct from all others, and accordingly each claim is to be treated in this manner when examined in the light of the prior art in any determination of novelty or validity.

Variations and modifications are possible without departing from the spirit of the invention.

What is claimed is:

1. A monitoring system for an automobile or other vehicle, comprising in combination:
   (a) an automobile radio having an on-off switch enabling it to be energized from the vehicle electrical supply, and having an audio output line,
   (b) a speaker electrically connected to be driven by said audio output line,
   (c) an audio signal generator electrically connected to and powered by the electrical system of the vehicle, and having an output lead adapted to drive the speaker, and
   (d) control means electrically connected with said audio signal generator and responsive to changes in a condition in the automobile or vehicle that is being monitored, for selectively providing an audio signal from said signal generator to said speaker so as to indicate to the car's driver the existence of said condition,
   (e) an impedance permanently connected to and in series with the audio output line of the radio and the speaker, and
   (f) a switch bridging the impedance, said switch being open when the audio signal is provided to the speaker and being closed when no audio signal is provided, whereby a load is permanently presented to the radio output.

2. The invention as defined in claim 1, wherein:
   (a) said control means comprises an electrical lead extending from the output of the signal generator to said speaker,
   (b) said electrical lead remaining permanently connected with said speaker at all times, regardless of whether or not the radio is energized.

3. A monitoring system for an automobile or other vehicle, comprising in combination:
   (a) an automobile radio having an on-off switch enabling it to be energized from the vehicle electrical supply, and having at least two audio output lines,
   (b) a pair of speakers electrically connected to be driven by said radio output lines respectively,
   (c) an audio signal generator electrically connected to and powered by the electrical system of the vehicle, and having an output lead adapted to drive a speaker, and
   (d) means electrically connected with said audio signal generator and responsive to changes in a condition in the automobile or vehicle that is being monitored, for selectively coupling at least a portion of the audio signal from said signal generator to at least one of the said pair of speakers so as to indicate to the driver the existence of said condition,
   (e) the amplitude of the coupled signal when applied to said one speaker being adequate to enable it to be readily heard regardless of whether the radio is energized at a normal level or not energized,
   (f) said selective coupling means comprising an electrical lead extending from the output of the signal generator to said one speaker;
   (g) said electrical lead remaining connected with said speaker at all times, regardless of whether or not the radio is energized,
   (h) said coupling means further comprising switching means connected with one of the audio output lines and said one speaker, for attenuating the amplitude of the wave coming from the radio at those times when the radio is energized and the signal generator is operating, (i) said switching means comprising an electrical relay of the single pole, single throw variety, having two contactor terminals,
(j) one contactor terminal being connected to said one audio output line, and the other contactor terminal being connected to said speaker.

4. The invention as defined in claim 3, wherein:
(a) said switching means further comprises an attenuator resistor connected across the two contactor terminals of the relay.

5. The invention as defined in claim 1, wherein:
(a) said control means comprises means selectively enabling and disabling said signal generator in response to said changes in conditions being monitored.

6. A monitoring system for an automobile or other vehicle, comprising in combination:
(a) an automobile radio having an on-off switch enabling it to be energized from the vehicle electrical supply, and having at least two audio output lines,
(b) a pair of speakers electrically connected to be driven by said radio output lines respectively,
(c) an audio signal generator electrically connected to and powered by the electrical system of the vehicle, and having an output lead adapted to drive a speaker, and
(d) means electrically connected with said audio signal generator and responsive to changes in a condition in the automobile or vehicle that is being monitored, for selectively coupling at least a portion of the audio signal from said signal generator to at least one of the said pair of speakers so as to indicate to the driver the existence of said condition,
(e) the amplitude of the coupled signal when applied to said one speaker being adequate to enable it to be readily heard regardless of whether the radio is energized at a normal level or not energized,
(f) said coupling means comprising switching means including an electrical relay having contactor terminals connected respectively with one of the audio output lines of the radio and the speaker, and
(g) a driver circuit for the relay, for controlling the operation of the latter as a function of the operation of the signal generator.

7. The invention as defined in claim 6, wherein:
(a) said driver circuit comprises a rectifier connected between said signal generator and relay.

8. The invention as defined in claim 7, wherein:
(a) said driver circuit further comprises a filter disposed between said rectifier and relay.

9. The invention as defined in claim 8, wherein:
(a) said driver circuit further comprises an amplifier stage disposed between said rectifier and relay.

10. The invention as defined in claim 6, wherein:
(a) said signal generator comprises an oscillator and a modulator,
(b) said driver circuit being connected with said oscillator and rendered operative in response to operation of the oscillator.

11. The invention as defined in claim 1, wherein:
(a) said control means comprises means associated with said signal generator, for rendering the latter operative in response to the occurrence of a predetermined condition being monitored in said automobile or vehicle,
(b) said means for rendering operative the signal generator comprising an electrical lead connected with a supply terminal of the signal generator, and
(c) a switch connected with said electrical lead and disposed at a predetermined location on the vehicle, said switch being arranged to monitor the said condition.

12. The invention as defined in claim 6, wherein:
(a) said signal generator is selectively switched on and off, and said relay is normally unenergized when the signal generator is off.

13. The invention as defined in claim 12, wherein:
(a) said relay is of the single pole, single throw variety, having two contactor terminals, normally closed.

14. A condition monitoring system for an automobile or other vehicle, comprising in combination:
(a) an automobile radio having an on-off switch enabling it to be energized from the vehicle electrical supply, and having an audio output line,
(b) a speaker,
(c) a signal generator permanently connected to said speaker,
(d) a switch connected in circuit with said audio output line and said speaker, said switch being normally closed so as to connect said speaker to the output line, but being capable of being opened to isolate the speaker from the radio, and
(e) means responsive to energization of said signal generator for operating said switch and thus isolating the speaker from the radio and enabling the signal generator to drive the speaker without interference or loading from the output stage of the radio, and
(f) an impedance connecting the output line of the radio to the speaker at all times, so as to provide a permanent load for the radio output and thereby prevent possible damage thereto as a result of operation with no load.

15. A condition monitoring system for an automobile or other vehicle, comprising in combination:
(a) an automobile radio having an on-off switch enabling it to be energized from the vehicle electrical supply, and having at least two audio output lines,
(b) a first speaker electrically connected to one of said audio output lines,
(c) a second speaker adapted to be driven from the other of the audio output lines,
(d) a signal generator connected to said second speaker,
(e) a switch connected in circuit with said other audio output line and said second speaker, said switch being normally closed so as to connect said second speaker to the said other output line, but being capable of being opened to isolate the second speaker from the radio,
(f) means responsive to energization of said signal generator for operating said switch and thus isolating the second speaker from the radio and enabling the signal generator to drive the second speaker without interference or loading from the output stage of the radio, and
(g) an impedance connected across the switch, such that when the latter opens, the output circuit of the radio is not without a load, thereby minimizing the possibility of damage occurring thereto.

16. The invention as defined in claim 14, and further including:
(a) condition responsive means disposed remotely from the radio and signal generator, and being capable of enabling the latter in order to indicate the existence of said condition.

17. The invention as defined in claim 14, and further including:

(a) condition responsive means disposed remotely from the radio and signal generator, for energizing the latter.

18. The invention as defined in claim 15, wherein:

(a) the value of said impedance exceeds by a substantial amount, the speaker impedance.

* * * * *